United States Patent [19]
Jang

[11] Patent Number: 5,674,153
[45] Date of Patent: Oct. 7, 1997

[54] HYDRAULIC PRESSURE CONTROL SYSTEM OF AN AUTOMATIC TRANSMISSION FOR VEHICLE

[75] Inventor: Jaeduk Jang, Kyungki-do, Rep. of Korea

[73] Assignee: Hyundai Motor Company, Rep. of Korea

[21] Appl. No.: 562,088

[22] Filed: Nov. 22, 1995

[30] Foreign Application Priority Data

Nov. 24, 1994 [KR] Rep. of Korea ............... 94-31061

[51] Int. Cl.$^6$ .................................................. F16H 61/26
[52] U.S. Cl. ........................ 477/131; 477/116; 477/158; 477/906
[58] Field of Search ...................... 477/116, 130, 477/131, 127, 158, 159, 906; 475/116, 119

[56] References Cited

U.S. PATENT DOCUMENTS

| | | | |
|---|---|---|---|
| 4,519,273 | 5/1985 | Shimizu et al. | 477/117 X |
| 4,742,732 | 5/1988 | Hiramatsu | 477/119 |
| 5,111,717 | 5/1992 | Takeuchi et al. | 477/148 |
| 5,191,815 | 3/1993 | Kouta | 477/906 X |
| 5,417,627 | 5/1995 | Iizuka | 477/143 |
| 5,472,389 | 12/1995 | Ando et al. | 477/906 X |
| 5,521,818 | 5/1996 | Palansky et al. | 477/906 X |
| 5,537,887 | 7/1996 | Jang | 477/131 X |
| 5,542,888 | 8/1996 | Takada et al. | 477/130 X |

Primary Examiner—Charles A. Marmor
Assistant Examiner—Peter T. Kwon
Attorney, Agent, or Firm—Finnegan, Henderson, Farabow, Garrett, Dunner, L.L.P.

[57] ABSTRACT

Disclosed is the hydraulic control system of an automatic transmission for a vehicle which can effectively control a power train even though all of one-way clutches is omitted to simplify the power train structure, including a hydraulic pump which is operated by power of an engine to produce a line pressure; a manual valve cooperating with a shift selector lever; a torque converter control part; a pressure regulator part for regulating the line pressure, the pressure regulator part being controlled in accordance with ON/OFF operations of solenoid valves; a pressure control part which is controlled by the line pressure from the pressure regulator part to thereby control a flow of a hydraulic pressure fed from the manual valve; and a shift control part for selectively feeding the hydraulic pressure fed from the pressure control part to each friction member.

8 Claims, 10 Drawing Sheets

FIG.5

|  | S1 | S2 | S3 | S4 |
|---|---|---|---|---|
| First Speed | OFF | ON | ON | ON |
| Second Speed | OFF | OFF | ON | ON |
| Third Speed | OFF | OFF | OFF | OFF |
| Fourth Speed | ON | OFF | OFF | ON |
| Reverse | — | — | OFF | — |

FIG.6

|  |  | C1 | C2 | C3 | B1 | B2 | Engine Brake |
|---|---|---|---|---|---|---|---|
| P |  |  |  |  |  |  | × |
| R |  |  |  | ○ | ○ |  | ○ |
| N |  |  |  |  | ○ |  | × |
| D | 1 | ○ |  |  | ○ |  | ○ |
| D | 2 | ○ |  |  |  | ○ | ○ |
| D | 3 | ○ | ○ |  |  |  | ○ |
| D | 4 |  | ○ |  |  | ○ | ○ |
| 3 | 1 | ○ |  |  | ○ |  | ○ |
| 3 | 2 | ○ |  |  |  | ○ | ○ |
| 3 | 3 | ○ | ○ |  |  |  | ○ |
| 2 | 1 | ○ |  |  | ○ |  | ○ |
| 2 | 2 | ○ |  |  |  | ○ | ○ |
| L | 1 | ○ |  |  | ○ |  | ○ |

HYDRAULIC PRESSURE CONTROL SYSTEM OF AN AUTOMATIC TRANSMISSION FOR VEHICLE

BACKGROUND OF THE INVENTION (1) Field of the Invention

The present invention relates to a hydraulic control system of an automatic transmission for vehicle and, more particularly, to a hydraulic control system which can effectively control a power train where all of one-way clutches are omitted to simplify the structure thereof.

(2) Description of the Prior Art

In general, an automatic transmission provides a necessary gear ratio to operate the vehicle under wide range of speeds and loads. It does this with a minimum amount of effort on the part of the driver. That is, automatic upshifts and downshifts are a convenience for the driver because a foot-operated clutch is not required to shift gear and because the vehicle can be brought to a stop without the use of a clutch and without shifting the transmission into neutral.

A conventional automatic transmission for a vehicle comprises a torque converter having an impeller, a turbine and a stator, a gear train connected to the torque converter to provide various forward speed ranges and reverse, a plurality of friction member such as disc clutch, one-way clutches which control gear action, and a hydraulic control system for controlling the operation of the friction member.

In recent years, power trains which have not one-way clutches to simply the structure thereof have been proposed. In the power train without one-way clutches should independently control each friction members to improve responsiveness with respect to the gear shifting. That is, in upshifting or downshifting, a friction member which has been released should be applied by receiving hydraulic pressure and another friction member which has been applied should be released by exhausting hydraulic pressure. Therefore, feeding or exhausting timing of hydraulic pressure has great effect on shift shock.

Accordingly, in case the timing between the feeding and exhausting of hydraulic pressure is not precisely controlled, engine run up occurs to thereby damage the friction member.

SUMMARY OF THE INVENTION

Therefore, it is an object of the present invention to provide a hydraulic pressure control system of an automatic transmission for a vehicle which can enhance responsiveness with respect to the shift operation by independently controlling the application and release of each friction member and can ideally control the timing of the feeding and exhausting of hydraulic pressure at each shift stage to thereby reduce shift shock.

It is another object of the present invention to provide a hydraulic control system which can prevent the power train from being damaged by providing a fail-safe means.

To achieve the above objects the present invention provides a hydraulic control/system of an automatic transmission for a vehicle, comprising: a hydraulic pump which is operated by power of an engine to produce a line pressure; a manual valve cooperating with a shift selector lever; a torque converter control part; a pressure regulator part regulating the line pressure, the pressure regulator part being controlled in accordance with ON/OFF operations of solenoid valves; a pressure control part which is controlled by the line pressure from the pressure regulator part to thereby control a flow of a hydraulic pressure fed from the manual valve; and a shift control part for selectively feeding the hydraulic pressure fed from the pressure control part to each friction member, wherein a first speed is accomplished by feeding a hydraulic pressure from the manual valve to a first friction member via both the pressure control part and the shift control part and by feeding a hydraulic pressure from the manual valve to a second friction member via the shift control part; a second speed is accomplished in a state of the first speed by feeding a hydraulic pressure to an application chamber of a third friction member and by exhausting the hydraulic pressure, which has been fed to the second friction member, through the shift control part; a third speed is accomplished in a state of the second speed by feeding a hydraulic pressure to a release chamber of the third friction member via the pressure control part, and by feeding a hydraulic pressure to a fourth friction member via both the pressure control part and the shift control part; and a fourth speed is accomplished in a state of the second speed by exhausting the hydraulic pressure which has been fed to the first friction member through the shift control part and by exhausting the hydraulic pressure which has been fed to the application chamber of the third friction member through the pressure control part.

Further, the pressure control part includes first to fourth pressure control valves, each of which has a first port for receiving hydraulic pressure from the manual valve, a second port for feeding the hydraulic pressure coming through the first port to the shift control part, and a third port for receiving hydraulic pressure from the pressure regulator part and has a valve spool which is displaced by the hydraulic pressure coming through the third port in accordance with an ON/OFF operation a solenoid valve to vary the ports.

The shift control part includes a front clutch exhaust valve for feeding hydraulic pressure to the first friction member in the first, second and third speeds and exhausting hydraulic pressure which has been fed to the first friction member, a rear clutch valve for feeding hydraulic pressure to the fourth friction member in the third and fourth speeds and to the second friction member in a reverse range, a low/reverse valve for feeding hydraulic pressure to the second friction member in the first speed, neutral and reverse ranges to increase an manual shift quality.

The shift control part further includes a fail safe valve for exhausting hydraulic pressure of the first friction member during a 3–4 speed shifting operation.

The fail safe valve is connected to the front clutch exhaust valve to control a port variation of the front clutch exhaust valve.

The fourth pressure control valve has a line connection which directly feed hydraulic pressure to the application chamber of the third friction member.

The pressure control part includes accumulators which can alleviate a pulsation of hydraulic pressure during a downshifting.

When shifting the shift selector lever from a neutral range to a reverse range, a fifth friction member is applied by the third pressure control valve, when shifting the shift selector lever, the fifth friction member is released, thereby improving shift quality.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 5 is a table illustrating the operation status of the solenoid valves used in the hydraulic control system depicted in FIG. 1;

FIG. 6 is a table illustrating the combination of frictional members, which control the power train depicted in FIG. 1, at each speed ratio;

DETAILED DESCRIPTION OF THE PREFERRED EMBODIMENTS

Figure 1:
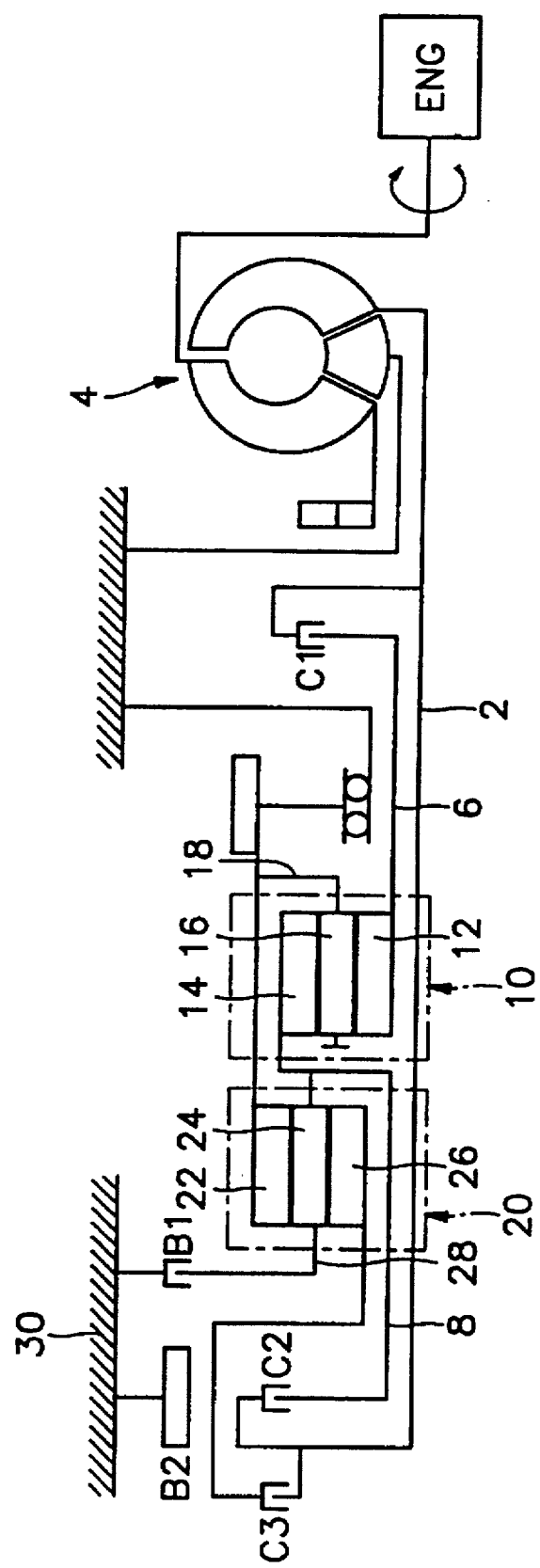
FIG. 1 is a schematic view showing a power train which is controlled by a hydraulic control system according to a preferred embodiment of the present invention.

Reference will now be made in detail to the present preferred embodiment of the invention, an example of which is illustrated in the accompanying drawings. Wherever possible, the same reference numbers will be used throughout the drawings to refer to the same or like parts.

Certain terminology will be used in the following description for convenience and reference only and will not be limiting. The words "right" and "left" will designate directions in the drawings to which reference is made.

As used herein a shift directly from a fourth speed to a second speed is a skip downshift wherein one speed ratio (i.e. 3rd speed) is skipped and a shift directly from the second speed to the fourth speed is a skip upshift wherein one speed (i.e. 3rd speed) is skipped.

FIG. 1 shows a power train which is controlled by a hydraulic control system of an automatic transmission according to a preferred embodiment of the present invention. The power train comprises a torque converter 4 for transmitting power from the engine to an input shaft 2 of the transmission unit, first and second power transmitting members 68 which are independently rotatably disposed around the input shaft 2, and first and second friction members C1 and C2 for selectively transmitting the power of the engine to the first and second power transmitting members. The power train has a symmetry structure on the bases of the input shaft 2, wherein one half thereof is illustrated in FIG. 1.

The first and second power transmitting members 6 and 8 are designed to transmit power to a first planetary gear unit 10. The first power transmitting member 6 is fixed to a sun gear 12 of the first planetary gear unit 10 and the second power transmitting member 8 is fixed to a ring gear 14 of the first planetary gear unit 10.

Further, a planet gear 16 of the first planetary gear unit 10 is connected to a ring gear 22 via a carrier 18 and the ring gear 14 of the first planetary gear unit 10 is connected to planet gears 24 of the second planetary gear unit 20.

A sun gear 26 of the second planetary gear unit 20 is designed to receive power of the input shaft 2 via a third friction member C3, a carrier connecting the planet gears 24 to each other is selectively fixed by a fourth friction member B1 to act as a reacting element.

A fifth friction member B2 mounted on a transmission case 30 is designed to selectively fix the sun gear 26 of the second planet gear 20.

Figure 2:
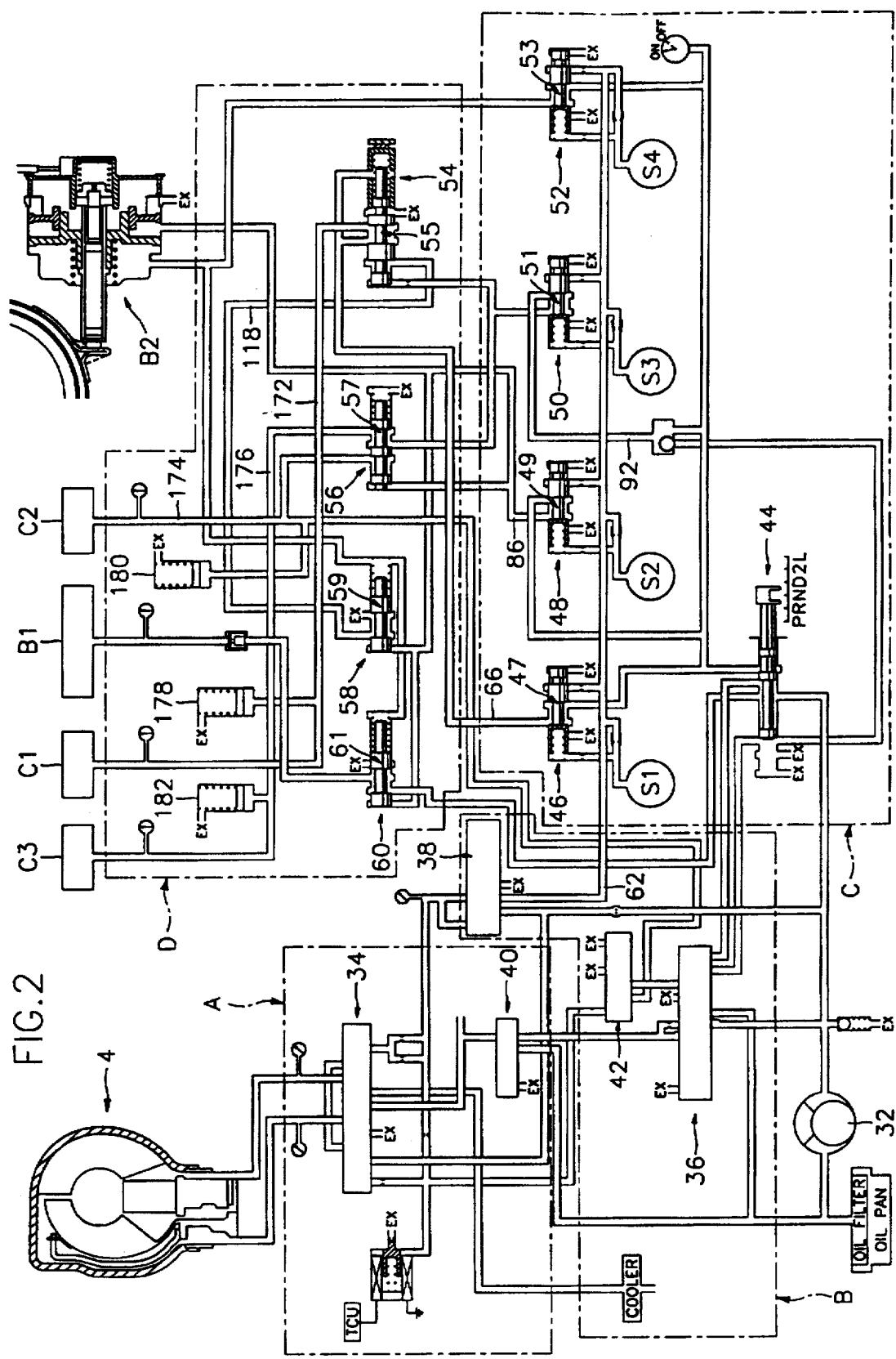
FIG. 2 is a view showing a hydraulic control system of an automatic transmission according to a preferred embodiment of the present invention.

FIG. 2 shows a hydraulic control system which control the first to fifth friction members and the torque converter in accordance with a preferred embodiment of the present invention. Reference numeral 32 indicates a hydraulic pump which is operated by power of the engine to produce line pressure. The hydraulic control system comprises a torque converter control part A having a damper clutch control valve 34 for controlling a damper clutch which is used for improving power transmission efficiency and a torque converter control valve 40 for regulating the amount of the oil for operating and lubricating the torque converter 4, a pressure regulator part B having a regulator valve 36 for regulating the line pressure, a reducing valve 38 for reducing hydraulic pressure to be solenoid supply pressure which is lower than the line pressure, and a high-low pressure valve 42 for further reducing the line pressure in third and fourth speeds of a drive "D" range.

The hydraulic control system further comprises a pressure control part C having a manual valve 44 which is cooperating with a shift lever(not shown) to supply or exhaust hydraulic pressure, and first to fourth pressure control valves 46, 48, 50 and 52 for controlling the flow of the hydraulic pressure fed from the manual valve 44, and a shift control part D for feeding the hydraulic pressure to each friction member C1, C2, C3, B1 and B2.

The shift control part D includes a front clutch exhaust valve 54 for receiving the hydraulic pressure from the first pressure control valve 46 of the pressure control part C, a rear clutch valve 56 which is controlled by the hydraulic pressure from the second pressure control valve 48, as well as a fail-safe valve 58 and a low/reverse valve 6.

The first to fourth pressure control valves 46, 48, 50 and 52 are respectively controlled by ON/OFF operations of first to fifth solenoid valves S1 to S4 which are duty controlled by a transmission control unit TCU.

Hydraulic pressure concerning the control of the pressure control valves 46, 48, 50, and 52 is directed to the solenoid valves S1 to S4 along a line 62 from the reducing valve 38 of the pressure regulating part B and, according to the On/Off operation of the solenoid valves S1 to S4, is formed on the hydraulic pressure on the pressure control valves 46, 48, 50 and 52 or is exhausted therethrough.

Further, the first to fourth pressure control valves 46, 48, 50 and 52 are designed to direct hydraulic pressure fed from the manual valve 44 to each valve of the shift control part D.

Figure 3:
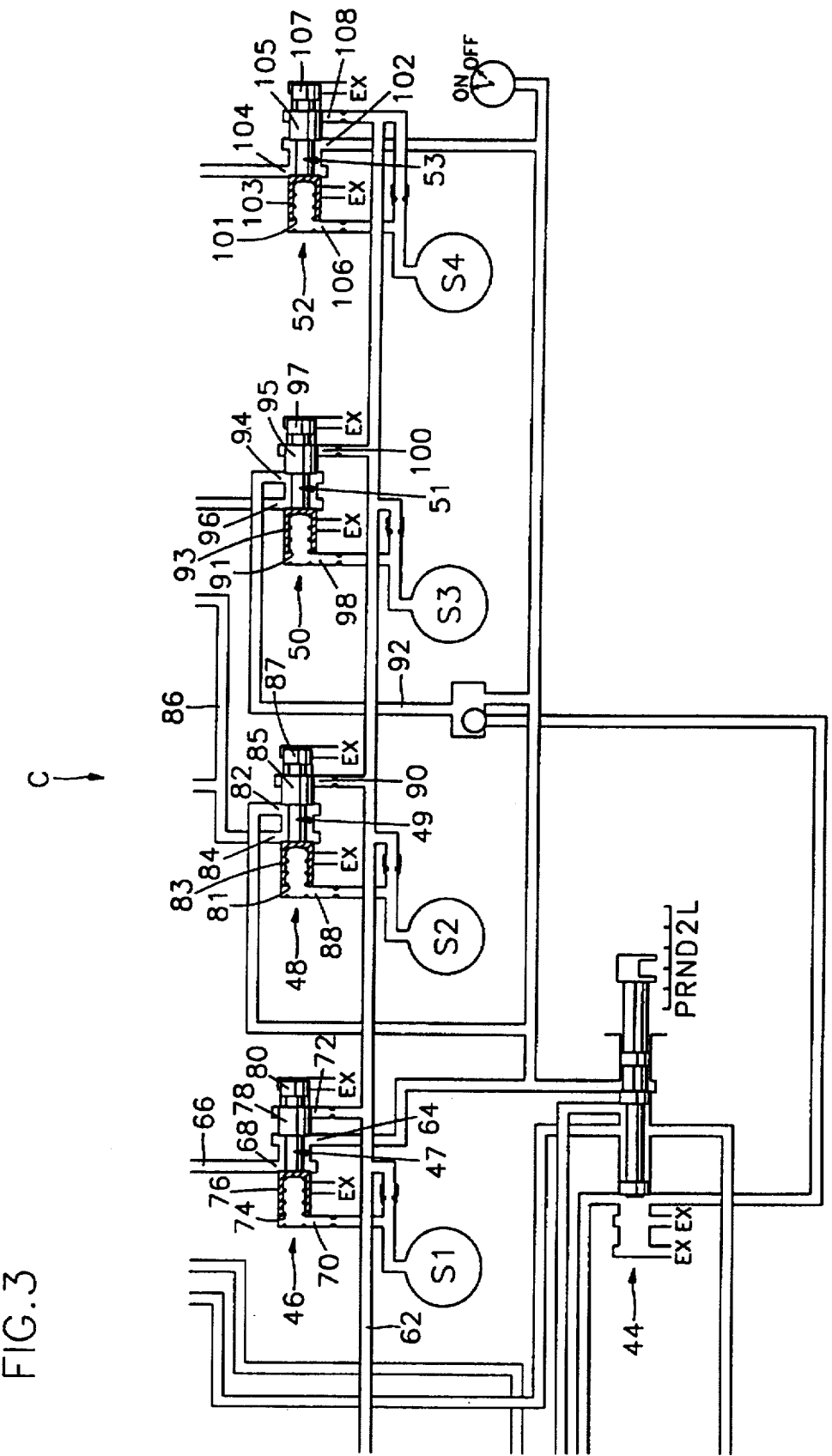
FIG. 3 is an enlarged view of a pressure control part(C) of the hydraulic control system depicted in FIG. 2.

FIG. 3 shows the pressure control part C in enlarged scale. The first pressure control valve 46 is provided with a first port 64 for receiving hydraulic pressure from the manual valve 44, a second port 68 for feeding the hydraulic pressure coming through the first port 64 to the front clutch exhaust valve 54 through the line 66, a third port 70 for, in a state of controlling the solenoid valve S1 to the OFF state, displacing a position of a valve spool 47 by receiving hydraulic pressure from the reducing valve 38 through a line 62, and a fourth port 72 to which the hydraulic pressure within the line 61 is directly fed.

The valve spool 47 of the first pressure control valve 46 has a first land 76 biased by a spring 74, on which the hydraulic pressure coming through the third port 70 acts, a second land 78 for opening/closing the first port 64, and a third land 80 for opening/closing an exit port Ex.

The second pressure control valve 48 is provided with a first port 82 for receiving hydraulic pressure from the manual valve 44, a second port 84 for feeding the hydraulic pressure coming through the first port 82 to an application chamber of the kickdown servo B2 and, at the same time, feeding the hydraulic pressure to the shift control valves 56, 58 and 60 as control pressure for them.

The second pressure control valve 48 is further provided with a third port 88 for displacing the position of the valve spool 49 by receiving the hydraulic pressure from the reducing valve through the line 62 when the second solenoid valve S2 is controlled to the OFF state, and a fourth port 90 for directly receiving the hydraulic pressure from the line 62.

The valve spool 49 of the second pressure control valve 48 has the same structure as that of the first pressure control valve 46 and includes a first land 83 biased by a spring 81, on which the hydraulic pressure coming through the third port 88 acts, a second land 85 for opening/closing the first port 82, and a third land 87 for opening/closing an exit port Ex.

The third pressure control valve 50 is provided with a first port 94 for receiving hydraulic pressure from the manual valve 44 through a line 92, a second port 96 for feeding the hydraulic pressure coming through the first port 94 to the shift control valves 54 and 56 of the pressure control part B as control pressure for them, a third port 98 for displacing the position of a valve spool 51 by receiving the hydraulic pressure from the reducing valve through the line 62 when the third solenoid valve S2 is controlled to an OFF state, and a fourth port 100 for directly receiving the hydraulic pressure from the line 62.

The valve spool 51 of the third pressure control valve 50 has the same structure as those of the first and second pressure control valves 46 and 48 includes a first land 93 biased by a spring 91, on which the hydraulic pressure coming through the third port 98 acts, a second land 95 for opening/closing the first port 94, and a third land 97 for opening/closing an exit port Ex.

The fourth pressure control valve 52 is provided with a first port 102 for receiving hydraulic pressure from the manual valve 44, a second port 104 for feeding the hydraulic pressure coming through the first port 102 to the release chamber of the kick down servo B2 and, at the same time, to the fail safe valve 58 as control pressure for it, a third port 106 for displacing the position of a valve spool 53 by receiving the hydraulic pressure from the reducing valve through the line 62 when the fourth solenoid valve S2 is controlled to an OFF state, and a fourth port 108 for directly receiving the hydraulic pressure from the line 62.

The valve spool 53 of the fourth pressure control valve 52 has the same structure as those of the above described pressure control valves and includes a first land 103 biased by a spring 103, on which the hydraulic pressure coming through the third port 106 acts, a second land 105 for opening/closing the first port 102, and a third land 107 for opening/closing an exit port Ex.

Figure 4:
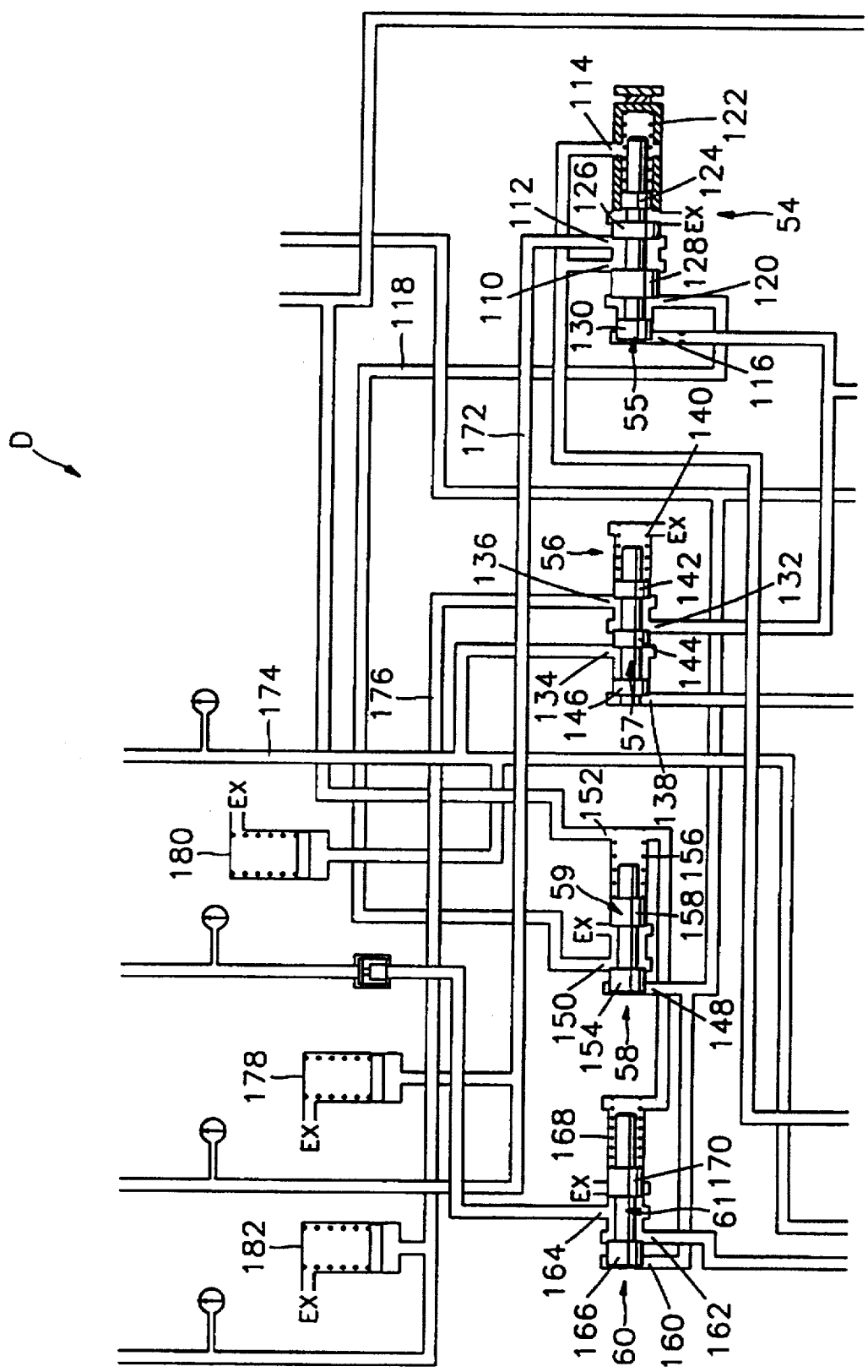
FIG. 4 is an enlarged view of a shift control part(D) of the hydraulic control system depicted in FIG. 2.

The shift control part D is shown in FIG. 4 as an enlarged scale. The front clutch exhaust valve 54 is provided with a first port 110 for receiving hydraulic pressure from the second port 68 of the first pressure control valve 46 through a line 66, a second port 112 for feeding the hydraulic pressure coming through the first port 110 to the front clutch C1, a third port 114 for receiving control pressure from the second port 68 of the first pressure control valve 46 through the line 66, a fourth port 116 for receiving control pressure from the second port 96 of the third pressure control valve 50, and a fifth port 120 connected to the fail safe valve 58 via a line 118.

The front clutch exhaust valve 54 includes a valve spool 55 having a first land 124 biased by a spring 122, a second land 126 for connecting/disconnecting the second port 112 to an exit port, a third land 128 on which the hydraulic pressure coming through the fifth port 120 acts, and a fourth land 130 on which the hydraulic pressure coming through the fourth port 116 acts.

The rear clutch valve 56 includes a second port 96 for receiving hydraulic pressure from the second port 96 of the third pressure control valve 50, a second port 134 for feeding the hydraulic pressure coming through the first port 132 to the direct clutch C2, a third port 136 for feeding the hydraulic pressure coming through the first port 132 to the reverse clutch, and a fourth port 138 for receiving control pressure from the second port 84 of the second pressure control valve 48.

The rear clutch valve 56 includes a valve spool 57 having a first land 142 biased by a spring 140, a second land 144 for opening/closing the first port 132, and a third land 146 on which the hydraulic pressure coming through the fourth port 138 acts.

The fail safe valve 58 is provided with a first port 148 for receiving control pressure from the second port 84 of the second pressure control valve 48, a second port 150 for feeding the hydraulic pressure coming through the first port 148 to the fifth port 120 of the front clutch exhaust valve 54, and a third port 152 for receiving hydraulic pressure for release chamber of the kickdown servo B2.

The fail safe valve includes a valve spool 59 having a first land 154 for interrupting/directing the hydraulic pressure coming through the first port 148 to the second port 150, and a second land biased by a spring 156.

Further, the low/reverse valve 60 is provided with a first port 160 for receiving control pressure from the second port 84 of the second pressure control valve 48, a second port 162 for receiving hydraulic pressure from the manual valve 44 when this manual valve is in the reverse mode, and a third port 164 for feeding hydraulic pressure coming through the second port 162 to the low/reverse brake B1.

The low/reverse valve 60 includes a valve spool 61 having a first land 166 on which the hydraulic pressure coming through the first port 160 acts and a second land 170 biased by a spring 168.

On the one hand, accumulators 178, 180 and 182 are respectively provided on a line 172 for feeding application pressure from the front clutch exhaust valve 54 to the front clutch C1, a line 174 for supplying application pressure from the rear clutch valve 56 to the direct clutch C2, and a line 176 for feeding application pressure from the rear clutch valve 56 to the reverse clutch C3.

Each of the accumulators 178, 180 and 182 has a structure such that a piston is biased by a spring in a chamber.

In the hydraulic control system as described above, the transmission control unit TCU controls the solenoid valves to ON/OFF states or according to a duty ratio based upon the throttle valve position and the vehicle road speed.

Parking "P" Range

In the parking "P" range, since hydraulic pressure is exhausted through an exit port Ex of the manual valve 44, no friction member is supplied with hydraulic pressure.

Neutral "N" Range

In the neutral "N" range, hydraulic pressure is fed from the manual valve 44 to the low/reverse brake B1 through the second and third ports 162 and 164 of the low/reverse valve 60.

In this case, as shown in FIG. 1, the planet carrier 28 of the second planetary gear unit is to be fixed such that power of the engine cannot be transmitted to the transmission unit.

The reason why the low/reverse brake B1 is applied in the neutral range N is for making the shift operation easy when the mode is changed to the drive "D" range or the reverse "R" range.

First Speed of Drive "D" range

Figure 7:
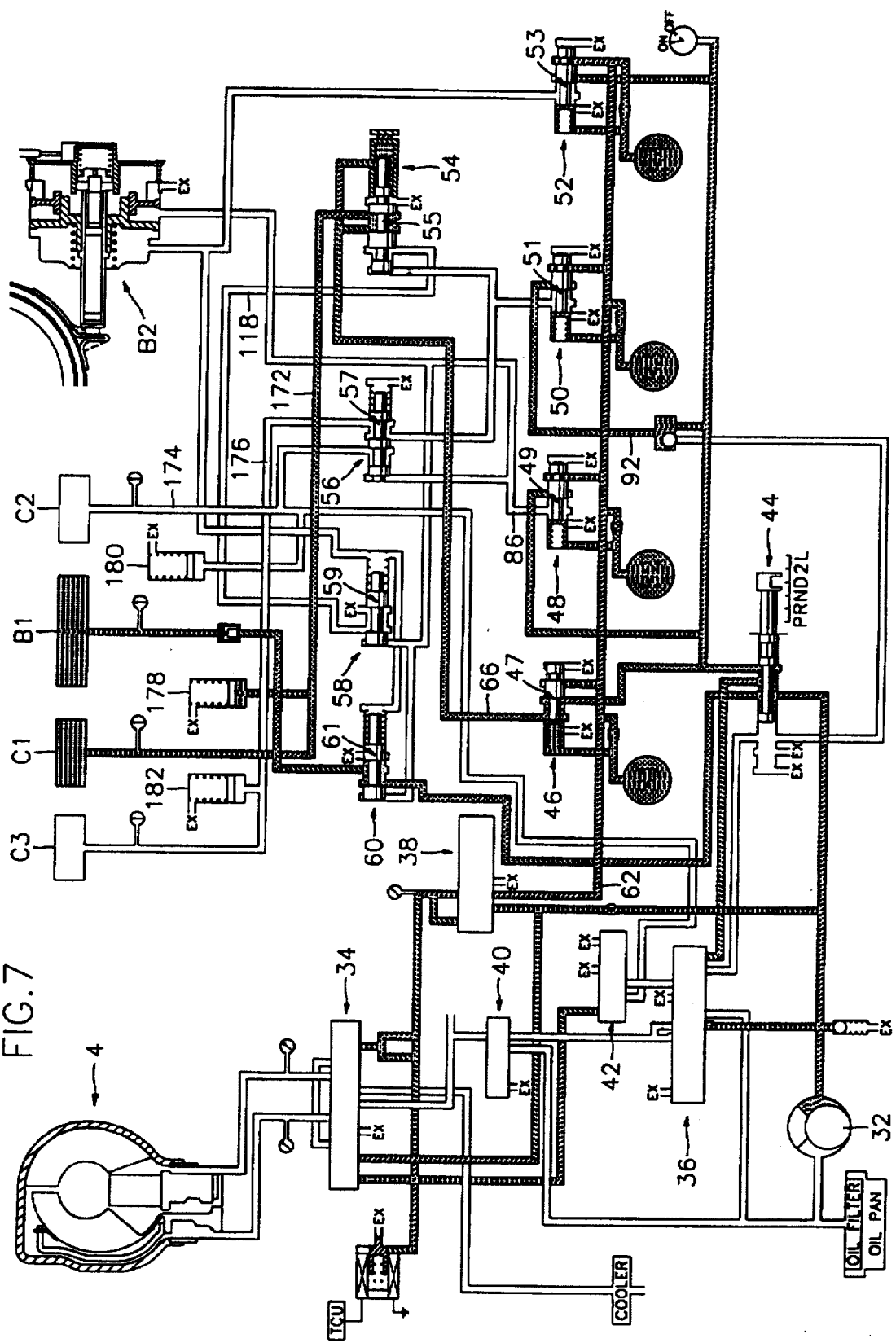
FIG. 7 is a view showing the location of hydraulic pressure when hydraulic control system in accordance with the present invention is in the first speed of the drive "D" range.

When the vehicle operator selects the drive "D" range of the shift select lever, the manual valve 44 interconnected with the shift select lever is changed from a state shown in FIG. 2 to that shown in FIG. 7 and the transmission control unit, as charted in FIG. 5, controls the first solenoid valve S1 to the OFF state and the second, third and fourth solenoid valves S2, S3 and S4 to the ON states according to a duty ratio.

FIG. 7 shows the location of hydraulic pressure when hydraulic control system in accordance with the present invention is in the first speed of the drive "D" range.

At this point, a portion of hydraulic pressure generated from the hydraulic pump 32 is fed to the first, second, third and fourth solenoid valves S1, S2, S3 and S4 as control pressure for the first, second, third and fourth pressure control valve 46, 48, 50 and 52. At this point, since one the first solenoid valve S is controlled to the OFF state, the hydraulic pressure is formed on only the third port 70 of the first pressure control valve 46.

Accordingly, the valve spool 47 of the first pressure control valve 46 is displaced towards the right such that the first and second ports 64 and 68 communicates with each other to direct hydraulic pressure fed from the hydraulic pump 32 via the manual vale 44 to the line 66.

At this point, the hydraulic pressure flowing along the line 66 is directed to the first port 110 of the front clutch exhaust valve 54 as application pressure, and then, since the valve spool 55 of the front clutch exhaust valve 54 is in a leftwarded state by elastic force of the spring 122, is fed to the front clutch C1 through the second port 112 to apply thereof, thereby accomplishing the first speed control.

Further, the hydraulic pressure flowing along the line 66 is also directed to the third port 114 of the front clutch exhaust valve 54 as control pressure to displace the valve spool towards the left.

As described above, when the front clutch C1 is applied in addition to the low/reverse brake B1 which has been applied in the neutral "N" range, as shown in FIG. 1, power of the engine is transmitted to the sun gear 12 of the first planetary gear unit 10 through the first power transmission unit 6.

At this point, although the ring gear 14 is to rotate through the planet gear 16, since the ring gear 14 is in a fixed state by the low/reverse brake B1, the first speed ratio having less rotation number than the input rotation number.

Second Speed of Drive "D" range

Figure 8:
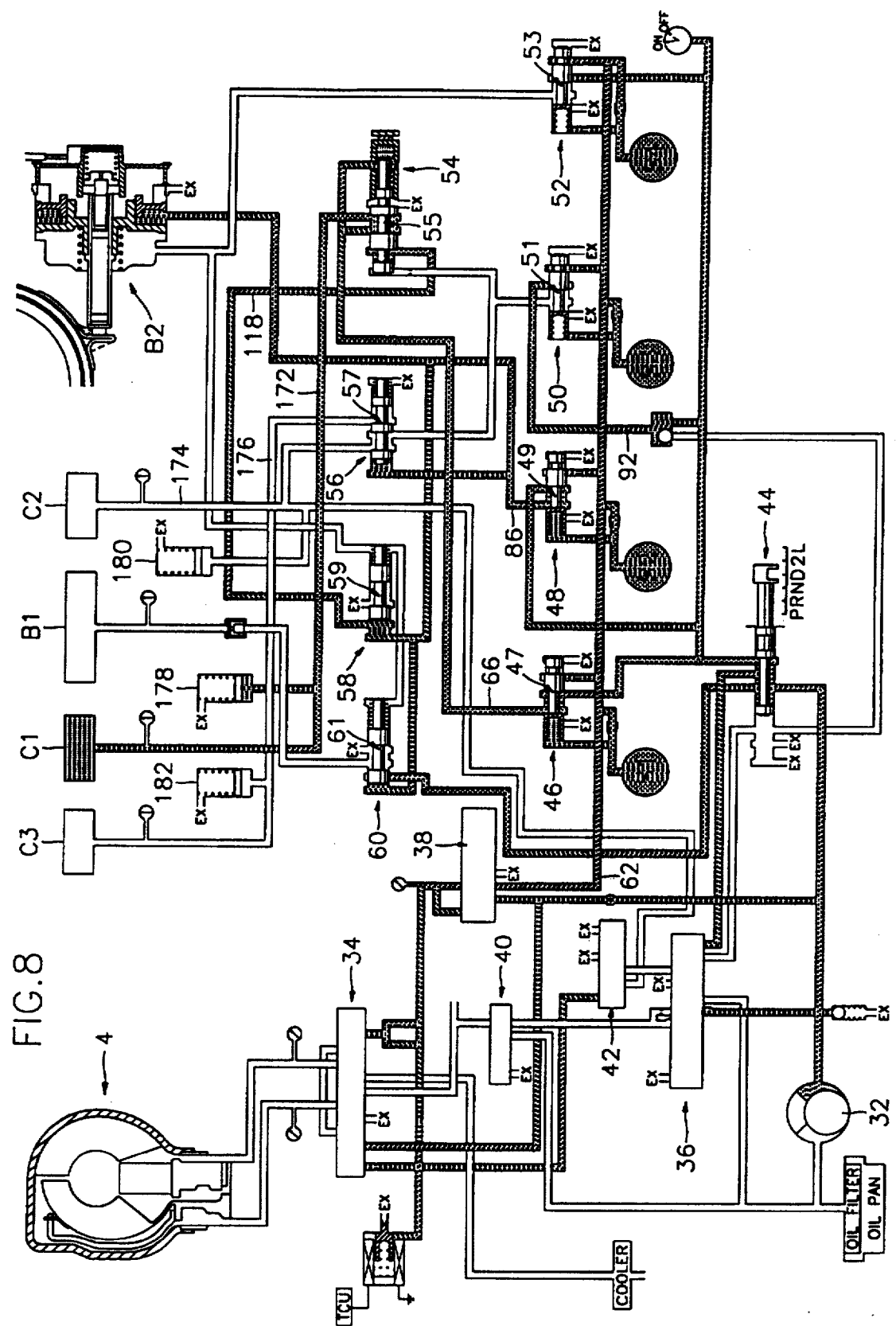
FIG. 8 is a view showing the location of hydraulic pressure when hydraulic control system in accordance with the present invention is in the second speed of the drive "D" range.

FIG. 8 shows the location of hydraulic pressure when hydraulic control system in accordance with the present invention is in the second speed of the drive "D" range.

As the vehicle speed and the throttle opening increase, the transmission control unit TCU starts to control the second solenoid valve S2 to the OFF state according to a duty ratio in addition to the first solenoid valve S1.

That is, as the solenoid valve S2 is controlled to the OFF state, the valve spool 49 of the second pressure control valve 48 is displaced towards the right such that application pressure coming through the first port 82 from the manual valve 44 is directed to the second port 84.

A portion of the application pressure leaving the second port 84 is fed to the application chamber of the kick down servo B2 along the line 86, and other portion of the application pressure is directed to the fourth port 138 of the rear clutch valve 56, the first port 148 of the fail safe valve 58, and the first port 160 of the low/reverse valve 60.

By this flow of hydraulic pressure, all the valve spools of the rear clutch valve, fail safe valve and lower/reverse valve 56, 38 and 60.

Accordingly, although hydraulic pressure coming through the first port 148 and leaving through the second port 150 of the fail safe valve 58 is directed to the fifth port 120 of the front clutch exhaust valve 54 along the line 118, the valve spool 55 of the front clutch exhaust valve 54 is not displaced towards the right by the sum of the force of the spring 122 and hydraulic pressure coming through the third port 114 thereof.

Further, since the valve spool 61 of the low/reverse valve 60 is displaced towards the right, hydraulic pressure fed from the manual valve 44 to the second port 162 is interrupted such that the application pressure which has been fed to the low/reverse brake B1 is released and exhausted through the exit port Ex of the low/reverse valve 60, thereby accomplishing the second speed control.

Third Speed of Drive "D" range

In the second speed control state, as shown in FIG. 1, although power of the engine is transmitted to the sun gear 12 of the first planetary gear unit 1, since the sun gear of the second planetary gear unit 20 is fixed, the second speed ratio is outputted.

Figure 9:
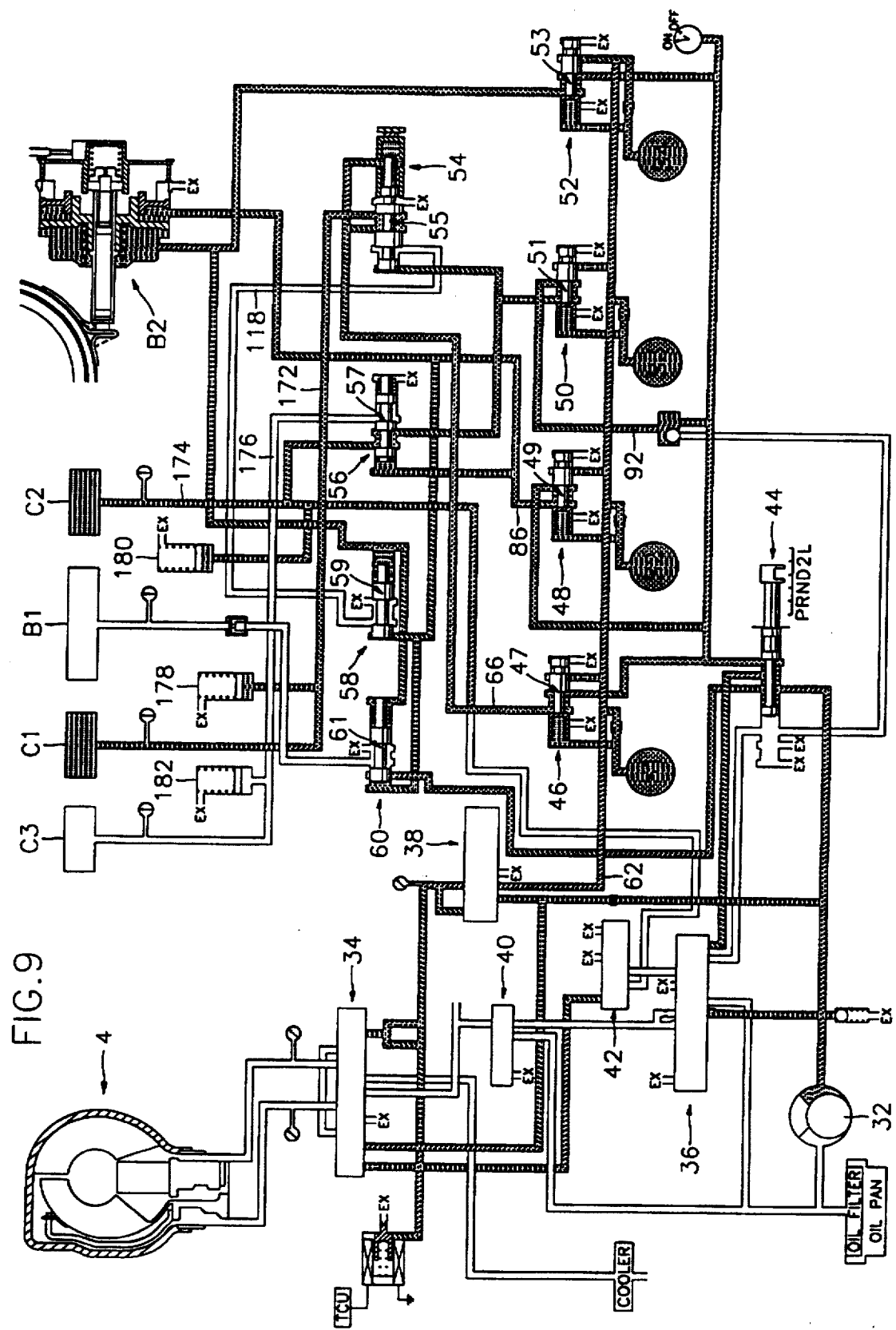
FIG. 9 is a view showing the location of hydraulic pressure when hydraulic control system in accordance with the present invention is in the third speed of the drive "D" range.

FIG. 9 shows the location of hydraulic pressure when hydraulic control system in accordance with the present invention is in the second speed of the drive "D" range.

As the vehicle speed and the throttle opening further increase, the transmission control unit TCU starts to control all second solenoid valves S1, S2, S3 and S4 to the OFF states according to a duty ratio.

Therefore, each valve spool of the first, second, third and fourth pressure control valves 46, 48, 50 and 52 is displace towards the right, and hydraulic pressure coming through each first port from the manual valve 44 leaves through each second port.

Accordingly, although the front clutch C1 maintains it application state, since hydraulic pressure is fed to the release chamber of the kick down servo B2, the kick down servo is released.

Further, hydraulic pressure coming through the first port 132 of the rear clutch valve 56 from the third pressure control valve 50 is fed to the direct clutch C2 through the second port 134 to apply thereof, thereby accomplishing the third speed control.

Then, as shown in FIG. 1, power of the engine is transmitted to both the sun gear 12 and the ring gear 14 of the first planetary gear unit 10, simultaneously, such that a shift ratio of 1:1 is outputted.

Fourth Speed of Drive "D" range

Figure 10:
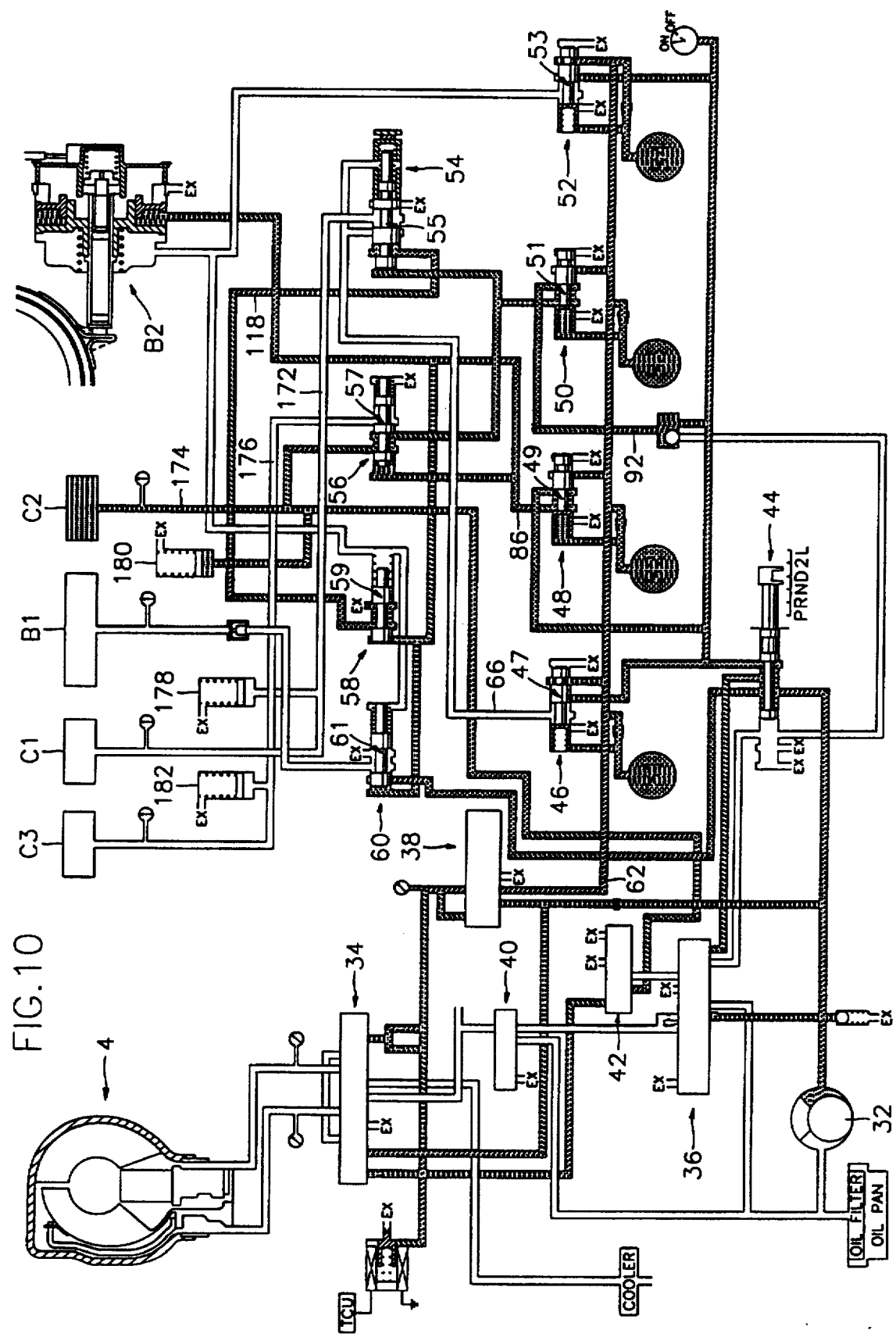
FIG. 10 is a view showing the location of hydraulic pressure when hydraulic control system in accordance with the present invention is in the fourth speed of the drive "D" range.

FIG. 10 shows the location of hydraulic pressure when hydraulic control system in accordance with the present invention is in the fourth speed of the drive "D" range.

As the vehicle speed and the throttle opening increase, the transmission control unit TCU starts to control the first and fourth solenoid valves S1 and S4 to the ON states according to a duty ratio, and the second and third solenoid valves S2 and S3 to the OFF states according to duty ratio.

By this control operation, as shown in FIG. 10, each valve spool of the first and fourth pressure control valves 46 and 52 is displaced towards the left.

As a result, hydraulic pressure which has been fed to the front clutch exhaust valve 54 is interrupted and hydraulic pressure which has been fed to both the release chamber of the kick down servo B2 and the third port 152 of the fail safe valve 58 is also interrupted.

At this point, application pressure for front clutch C1 is rapidly exhausted through the exit port Ex of the front clutch exhaust valve 54 and, at the same time, hydraulic pressure for the release chamber of the kick down servo B2 is also exhausted through the exit port of the fourth pressure control valve 52.

The reason why the application pressure for the front clutch C1 can be exhausted through the exit port Ex of the front clutch exhaust valve 54 is that hydraulic pressure coming through the first port 148 of the fail safe valve 58 is directed to the fifth port 120 of the front clutch exhaust valve 54 along the 118 via the second port of the fail safe valve 58 to displace the valve spool towards the right since hydraulic pressure which has been coming through the third port 152 of the fail safe valve 58 is also exhausted through the exit port Ex of the fourth pressure control valve 58.

The reason why the valve spool 55 can displace towards the right when hydraulic pressure is directed to the fifth port 120 of the front clutch exhaust valve 54 is that the sum of hydraulic pressure acting on the third and fourth land 128 and 130 is larger than elastic force of the spring 122 since hydraulic pressure is formed at the fourth port 116.

As described above, when the direct clutch C2 and the kick down servo B2 are applied, since power of the engine is induced to the ring gear 14 of the first planetary gear unit 10, and the sun gear 26 of the second planetary gear unit 20 is fixed, a shift ratio higher than the input speed is outputted.

As described above, when the speed is shifted from the third speed to the fourth speed, if the first solenoid valve S1 cannot be controlled to the ON state, hydraulic pressure cannot be fed to the third port 114 of the front clutch exhaust valve 54 such that application pressure for the front clutch C1 cannot be exhausted.

In this case, since the front clutch C1 remains its application state, the power train can be damaged. Accordingly, to prevent this, fail safe valve 58 is designed to feed hydraulic pressure to the front clutch exhaust valve 54 through the line 118 to act on the fifth land 120, such that the front clutch application pressure can be exhausted.

Reverse "R" Range

Figure 11:
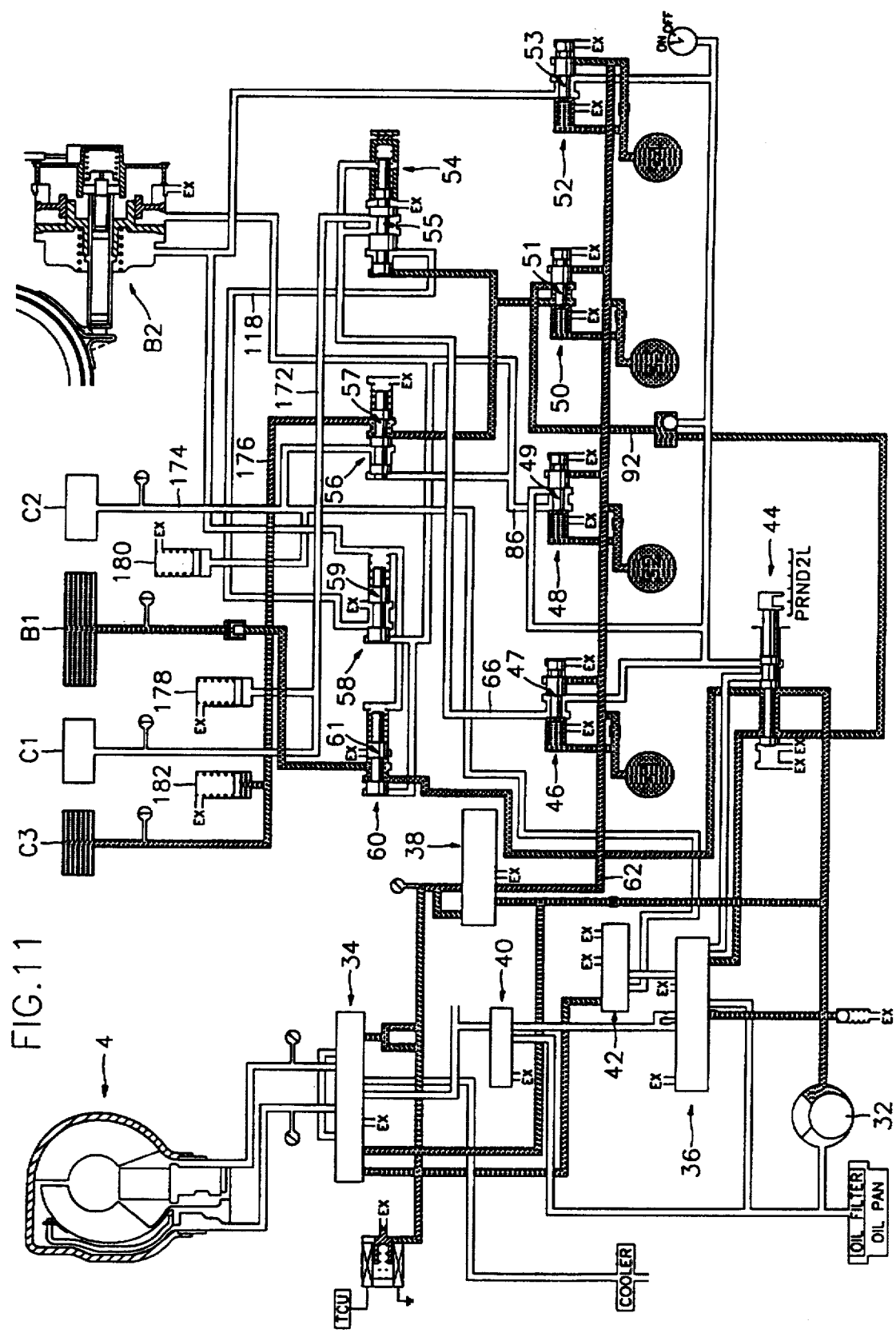
FIG. 11 is a view showing the location of hydraulic pressure when hydraulic control system in accordance with the present invention is in the reverse "R" range.

FIG. 11 shows the location of hydraulic pressure when hydraulic control system in accordance with the present invention is in the reverse "R" range.

Further, when the vehicle operator shifts the shift selector lever to the reverse "R" range, the transmission control unit, as charted in FIG. 5, starts to control the third solenoid valve S3 to an OFF state according to a duty ratio.

As described above, when the third solenoid valve S3 is controlled to the OFF state, hydraulic pressure coming through the first port 94 of the third pressure control valve 50 from the manual valve 44 leaves through the second port 96 and is directed to the first port 132 of the rear clutch valve 56.

At this point, since no control pressure is fed to the rear clutch valve 56, the valve spool 57 thereof is in the left-warded state by the elastic force of the spring. Accordingly, hydraulic pressure coming through the first port leaves through the third port 136 and is directed to the reverse clutch C3 along the line 176, thereby accomplishing the reverse mode. At this point, when the sudden acceleration is required during driving and thus the throttle opening suddenly increase, the transmission control unit TCU controls the second solenoid valve S2 to an OFF state according to a duty ratio to maintain the application state of the kick down servo B2. At this state, the transmission control unit TCU controls the third solenoid valve S3 to an OFF state according to interrupt hydraulic pressure fed to the direct clutch C2 and controls the first solenoid valve S1 to an OFF state to apply the front clutch C1.

By this control, a skip downshifting from the fourth speed to the second speed is realized to thereby improve responsiveness with respect to the shifting operation. In a same manner, a skip downshift from the third speed to the first speed is realized.

Further, when the vehicle operator shifts the shift selector lever to a "2" range in a state of the fourth speed of drive "D" range, in a same manner as the 4–2 skip downshifting, second speed is realized. When the vehicle operator shifts the shift selector lever to a "L" range in a state of the third speed of the drive "D" range. On each line connected to each friction member is provided an accumulator to reduce a pulsation of hydraulic pressure in 4–3 shifting, 2–3 upshifting and N-R mode change.

As described above, the hydraulic control system according to the present invention can simplify the structure of the power train by omitting all one-way clutch and enhance the responsiveness by independently controlling each friction member. since a friction member receives hydraulic pressure which exhausting hydraulic pressure which has been applied to another friction member, a synchronous shift control is enable.

In addition, in case that malfunction occurs during 3–4 speed shift, there is the fail safe valve to protect the power train, thereby providing stability during high speed running.

What is claimed is:

1. A hydraulic control system for an automatic transmission of a vehicle, comprising:

a hydraulic pump capable of being operated by an engine to produce line pressure of hydraulic fluid;

a manual valve cooperating with a shift selector lever;

a torque converter control;

a pressure regulator for regulating the line pressure, the pressure regulator being controlled in accordance with ON/OFF operations of solenoid valves;

a pressure control controlled by the line pressure regulated by the pressure regulator to thereby control flow of the hydraulic fluid from the manual valve; and a shift control for selectively feeding the hydraulic fluid from the pressure control part to friction members, wherein a first speed is accomplished by feeding the hydraulic fluid from the manual valve to a first friction member via both the pressure control and the shift control and by feeding the hydraulic fluid from the manual valve to a second friction member via the shift control, a second speed is accomplished in a state of the first speed by feeding the hydraulic fluid to an application chamber of a third friction member and by exhausting the hydraulic fluid fed to the second friction member through the shift control, a third speed is accomplished in a state of the second speed by feeding the hydraulic fluid to a release chamber of the third friction member via the pressure control and by feeding the hydraulic fluid to a fourth friction member via both the pressure control and the shift control, and a fourth speed is accomplished in a state of the second speed by exhausting the hydraulic fluid fed to the first friction member through the shift control and by exhausting the hydraulic fluid fed to the application chamber of the third friction member through the pressure control.

2. The hydraulic control system according to claim 1, wherein the pressure control includes first, second, third, and fourth pressure control valves, each of the pressure control valves having a first port for receiving hydraulic fluid from the manual valve, a second port for feeding the hydraulic fluid passing through the first port to the shift control, a third port for receiving hydraulic fluid from the pressure regulator, and a valve spool displaced by the hydraulic fluid passing through the third port in accordance with an ON/OFF operation a solenoid valve.

3. The hydraulic control system according to claim 1, wherein the shift control includes a front clutch exhaust valve for feeding hydraulic fluid to the first friction member in the first, second and third speeds and for exhausting hydraulic pressure fed to the first friction member, a rear clutch valve for feeding hydraulic fluid to the fourth friction member in the third and fourth speeds and to the second friction member in a reverse range, a low/reverse valve for feeding hydraulic fluid to the second friction member in the first speed, a neutral range and the reverse range to increase manual shift quality.

4. The hydraulic control system according to claim 3, wherein the shift control further includes a fail safe valve for exhausting hydraulic pressure from the first friction member during a speed shifting operation from the third speed to the fourth speed.

5. The hydraulic control system according to claim 4, wherein the fail safe valve is connected to the front clutch exhaust valve to control a port variation of the front clutch exhaust valve.

6. The hydraulic control system according to claim 2, wherein the fourth pressure control valve has a line connection directly feeding hydraulic fluid to the application chamber of the third friction member.

7. The hydraulic control system according to claim 1, wherein the pressure control includes accumulators for alleviating pulsation of hydraulic pressure during a downshifting.

8. The hydraulic control system according to claim 2, wherein when shifting the shift selector lever from a neutral position to a reverse position, a fifth friction member is applied by the third pressure control valve, and wherein when shifting the shift selector lever, the fifth friction member is released to improve shift quality.

* * * * *

UNITED STATES PATENT AND TRADEMARK OFFICE
CERTIFICATE OF CORRECTION

PATENT NO. : 5,674,153
DATED : October 7, 1997
INVENTOR(S) : Jaeduk Jang

It is certified that error appears in the above-identified patent and that said Letters Patent is hereby corrected as shown below:

Title Page, [57] Abstact, line 3, "all of one-way clutches is omitted" should read --all one-way clutches are omitted--.

Signed and Sealed this

Seventeenth Day of February, 1998

Attest:

BRUCE LEHMAN

Attesting Officer

Commissioner of Patents and Trademarks